May 11, 1965   F. R. HERITIER   3,182,906
TAXIMETERS
Filed March 25, 1963

INVENTOR
FRANCIS RAYMOND HERITIER
By Irwin S. Thompson
ATTY.

United States Patent Office 3,182,906
Patented May 11, 1965

3,182,906
TAXIMETERS
Francis Raymond Heritier, Acton, London, England, assignor to Geecen Limited, London, England, a British company
Filed Mar. 25, 1963, Ser. No. 267,509
Claims priority, application Great Britain, Apr. 3, 1962, 12,780/62
7 Claims. (Cl. 235—130)

This invention relates to taximeters and its object is to provide simple and effective means for changing the rate of advance of a fare indicator, e.g. to provide an initial rate (commonly called a tariff) followed by a different rate (or second tariff) beyond an initial predetermined distance of travel and time of waiting.

According to the present invention a taximeter comprises a rotary member, means for driving the rotary member alternatively in accordance with distance of travel and time of waiting, a fare indicator, a fare indicator operating means, advance means for operating the latter with a succession of advance movements according to the rotation of the rotary member, and control means driven in accordance with distance and time for controlling the rate of advance and for changing the rate of advance from one predetermined rate for first tariff to a different predetermined rate for second tariff after a predetermined amount of movement of said rotary member.

By means of this invention the second tariff is changed (e.g. increased) not only in accordance with distance travelled but also in accordance with waiting time. The tariff for waiting time can be changed without changing the escapement of the taximeter clock mechanism.

In a preferred form of the invention the rotary member is a cam, and the fare indicator operating means includes a lever which is lifted (away from the cam centre) and dropped alternately by the cam, and the control means is a stopping device which stops predetermined dropping movements during the low tariff period and permits a greater number of said dropping movements during high tariff period.

Various constructional forms of the invention will now be described by way of example with reference to the accompanying diagrammatic drawings wherein.

Figure 1:
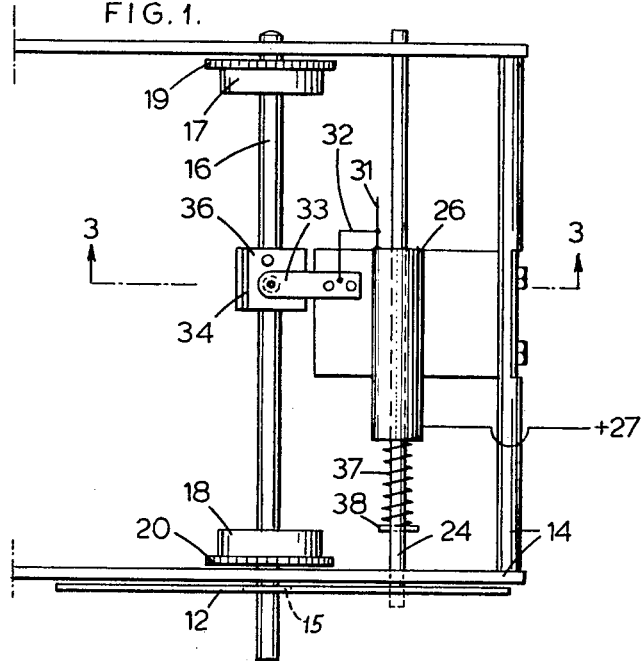
FIGURE 1 is a plan view of the relevant parts of a taximeter made in accordance with the invention.
Figure 2:
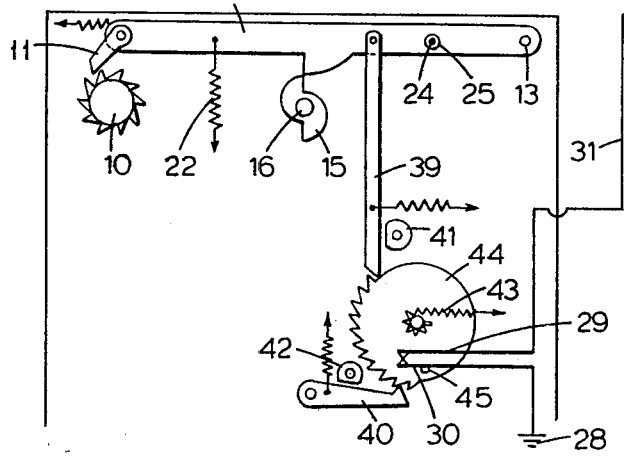
FIGURE 2 is an elevational view thereof.
Figure 3:
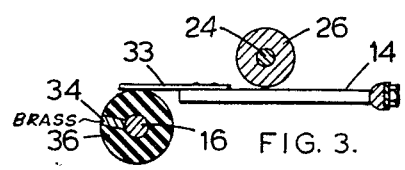
FIGURE 3 is a sectional view on line 3—3 on FIGURE 1.

The rotation of a ratchet wheel or drum 10 advances the fare indicating drums in known manner. Fare advance movements are applied to the wheel 10 by a pawl 11 carried by a lever 12 pivoted at 13 to the frame 14 of the taximeter. A rotary member 15 in the form of a two step cam is fixed on a shaft 16 that is driven by two unidirectional clutches 17, 18. Clutch 17 is driven by being fixed to a gearwheel 19 that is geared to a clockwork mechanism and clutch 18 is driven by being fixed to a gearwheel 20 that is geared to a distance drive device. The shaft 16 is therefore driven alternately by both distance of travel and time of waiting of the hired taxi. The lever 12 is raised by the steps of the cam 15 twice during each revolution of the shaft 16 and drops under the pull of a spring 22 so as to actuate the ratchet 10 at a rate suitable for the high tariff period. However these dropping or actuating movements of the lever are prevented during an initial fare period and alternate movements are prevented during a low tariff period, by controlling means including a locking member or rod 24 which can engage in a hole 25 in the lever 12. The rod 24 constitutes the core of a solenoid 26 which is energised by electric current supplied from a source 27. The current flows when the solenoid is earthed. This can be accomplished in either of two ways. First from an earth terminal 28 via a pair of switch contact arms 29, 30 and a conductor 31 (shown in both FIGURES 1 and 2). Second via a flexible contact arm 33 connected by conductor 32 to 31 and a strip of brass 34 which is fixed to the earthed shaft 16. The strip 34 is embedded in an insulating roll 36 which is fixed on the shaft 16 and contacts arm 33 immediately prior to the instant when lever 12 would normally fall over one of the steps of cam 15. A compression spring 37 on the locking rod 24 between the solenoid coil and an abutment 38 on rod 24 urges the rod to its locking position. The contacts 29, 30 are open in initial tariff period and in low tariff period and are closed in high tariff period so as to energise the solenoid continuously in the high tariff period thereby holding rod 24 retracted from lever 12 to allow the latter to drop at every step of the cam 15 e.g. twice per revolution of shaft 16 whereas during low tariff period the contacts 29, 30 are open and the rod 24 is retracted only once per revolution of shaft 16, i.e. each time strip 34 contacts arm 33. In order to close contacts 29, 30 during high tariff period a pin 45 is carried by a ratchet disc 44 having teeth engaged by a pawl 39 on lever 12. The pawl 39 rotates the disc 44 step by step until at the end of the low tariff period pin 45 contacts arm 30 and closes the contacts 29, 30 whereupon pawl 39 reaches a part of the disc 44 having no teeth so that further movements of pawl 39 do not rotate disc 44. The disc 44 is held by a non-return pawl 40. Pawls 39, 40 can be released by cams 41, 42 to permit return of disc 44 to zero position by spring 43.

The number of cam steps may be varied as well as the number of contacts on the rotary insulating block e.g. with three cam steps the lever may be allowed to fall once then miss two cam steps or actuate on two steps and miss one. Any reasonable number of cam steps may be provided according to the results required. For example the apparatus can be so arranged that the meter would register at 352 yards after the predetermined first tariff then have a second drop at 704 yards, then miss registration at 1056 yards, register again at 1408 yards and 1760 yards and so on or vice versa, this being achieved with a three drop cam. The apparatus can be arranged to effect change of tariff at any predetermined extent of distance and period of time.

The solenoid rod may be brass over one part of its length and steel over the remainder of its length to facilitate operation by the solenoid coil.

I claim:

1. A taximeter having a rotary cam member, means for driving the rotary cam member alternately in accordance with distance of travel and time, a fare indicator operating means, a reciprocating lever for operating the fare indicator operating means with a succession of advance movements according to the rotation of the rotary cam member, ratio change means for changing ratio of the numbers of advance movements applied to the fare indicator operating means per revolution of the rotary cam member, from one predetermined ratio for first tariff to a different predetermined rate of second tariff and control means driven in accordance with distance and time for causing said ratio change means to change said ratio after a predetermined amount of distance and time.

2. A taximeter as claimed in claim 1, wherein the ratio change means is a stopping device which stops predetermined operating movements of the reciprocating lever during the low tariff period and permits a greater number of said operating movements during high tariff period.

3. A taximeter as claimed in claim 2, wherein the rotary cam member effects two fare advance movements per revolution and alternate advance movements are stopped by the stopping device during low tariff period.

4. A taximeter, as claimed in claim 2, wherein the stopping device stops predetermined oscillating movements of the lever in low tariff period.

5. A taximeter having a rotary cam member, means for driving the rotary cam member alternately in accordance with distance of travel and time, a fare indicator operating means, a reciprocating lever for operating the fare indicator operating means with a succession of advance movements according to the rotation of the rotary cam member, ratio change means for changing ratio of the numbers of advance movements applied to the fare indicator operating means per revolution of the rotary cam member, from one predetermined ratio for first tariff to a different predetermined rate for second tariff and control means driven in accordance with distance and time for causing said ratio change means to change said ratio after a predetermined amount of distance and time, said ratio change means including a stopping device which stops predetermined operating movements of the reciprocating lever during the low tariff period and permits a greater number of said operating movements during high tariff period, said control means including a solenoid for moving the stopping device out of its stopping position, an electric circuit which includes said solenoid, said circuit also including first and second switches, the first switch being operatively connected with the rotary cam member so as to be closed during predetermined reciprocatory movements of the reciprocating lever; and a device for actuating the second switch to close it only during high tariff period.

6. A taximeter as claimed in claim 2, wherein the control means includes a locking member for locking the reciprocating lever against movement to stop predetermined fare advance movements thereof during one tariff period, said locking member being controlled by electrical means comprising a solenoid and a switch for energizing the solenoid, part of said switch being connected with said rotary cam member.

7. A taximeter having a rotary cam member 15, driving means 16–20 for driving the rotary cam member alternately in accordance with distance of travel and time, a fare indicator operating means 10, 11, a reciprocating lever 12 for operating the fare indicator operating means with a succession of advance movements according to the rotation of the rotary cam member, a stop member 24 for stopping a proportion of the advance movements of said lever in one tariff period, a solenoid 26 for holding said stop member 24 out of locking position when energised, a first switch means 33, 36 for controlling energisation of the solenoid, said first switch means including a part 36 driven by said driving means 16, a second switch means 29, 30 for controlling energisation of the solenoid to hold the locking member out of operation during the whole of another tariff period, control means 44, 45 for opening and closing the second switch means, and operating means 39 connected to the reciprocating lever 12 and driving said control means.

References Cited by the Examiner

FOREIGN PATENTS 772,798   4/57   Great Britain.

LEO SMILOW, *Primary Examiner.*